United States Patent [19]

Taketsugu

[11] Patent Number: 5,787,349
[45] Date of Patent: Jul. 28, 1998

[54] CONTROL SIGNALING NETWORK, RADIO BASE STATION AND MOBILE SWITCHING CENTER

[75] Inventor: Masanori Taketsugu, Tokyo, Japan

[73] Assignee: NEC Corporation, Japan

[21] Appl. No.: 351,554

[22] Filed: Dec. 7, 1994

Related U.S. Application Data

[63] Continuation of Ser. No. 22,656, Mar. 1, 1993, abandoned.

[30] Foreign Application Priority Data

Feb. 27, 1992 [JP] Japan .................................. 4-041599

[51] Int. Cl.$^6$ .................................................... H04Q 7/22
[52] U.S. Cl. ........................ 455/445; 455/435; 455/560
[58] Field of Search ............................ 379/58, 59, 60, 379/63; 455/33.1, 33.2, 56.1, 405, 422, 435, 445, 449, 560; 377/201, 207; 340/825.02, 826

[56] References Cited

U.S. PATENT DOCUMENTS

| | | | |
|---|---|---|---|
| 3,693,155 | 9/1972 | Crafton et al. | 340/825.02 |
| 4,833,702 | 5/1989 | Shitara et al. | 379/60 |
| 5,036,531 | 7/1991 | Spear | 379/58 |
| 5,153,902 | 10/1992 | Buhl et al. | 379/57 |
| 5,210,786 | 5/1993 | Itoh | 379/59 |
| 5,274,845 | 12/1993 | Wang | 455/33.1 |
| 5,291,544 | 3/1994 | Hecker | 379/60 |
| 5,377,262 | 12/1994 | Bales et al. | 379/207 X |
| 5,537,457 | 7/1996 | Lantto et al. | 379/58 |

FOREIGN PATENT DOCUMENTS

2193861  2/1988  United Kingdom ............ 379/61

Primary Examiner—Dwayne Bost
Assistant Examiner—William G. Trost
Attorney, Agent, or Firm—Ostrolenk, Faber, Gerb & Soffen, LLP

[57] ABSTRACT

A control signaling network comprises broadcast layers (80–111) in a tree-like arrangement and, if necessary, means (10–33) provided between the broadcast layers to check whether the broadcast data is to be passed or discarded. A mobile switching center (1-8) has a location registration data table (40-44) for storing a location registration area identification of a mobile apparatus and a broadcast data table (50-52) for storing identifications of the broadcasts layers governed by a different mobile switching center required to broadcast the broadcast data for mobile station call or identifications of broadcast layers governed by the different mobile switching centers.

8 Claims, 17 Drawing Sheets

FIG.5

| BROADCAST DATA IDENTIFICATION | RADIO ZONE IDENTIFICATION | MOBILE STATION IDENTIFICATION |
|---|---|---|

FIG.6

| BROADCAST DATA IDENTIFICATION | BROADCAST LAYER IDENTIFICATION | RADIO ZONE IDENTIFICATION | MOBILE STATION IDENTIFICATION |

FIG.14

| BROADCAST DATA IDENTIFICATION | MSC5,SL4,SL19 | SL5,SL20,Z36 | MS4 |
|---|---|---|---|

FIG.15

| BROADCAST DATA IDENTIFICATION | SL5,SL20,Z36 | MS4 |
|---|---|---|

FIG.18

| BROADCAST DATA IDENTIFICATION | MSC7 | SL7,SL24,Z46 | MS5 |
|---|---|---|---|

CONTROL SIGNALING NETWORK, RADIO BASE STATION AND MOBILE SWITCHING CENTER

This is a Continuation of application Ser. No. 08/022,656 filed on Mar. 1, 1993, abandoned.

BACKGROUND OF THE INVENTION

The present invention relates to a method of calling mobile stations moving in a plurality of radio zones by broadcasting.

Current mobile communication systems adopt a small zone system, in which all service areas are covered by a plurality of small radio zones. By the term "small radio zone" is meant an area served by each radio base station for communication with mobile stations using radio channels. In this small zone system, the location information of each mobile station has to be registered in an area to be notified to the radio base stations. In the current automotive telephone system, each radio zone is covered by a single registered area, as shown in "Automotive Telephone", the Institute of Electronics and Communication Engineers of Japan, p-p. 185–191. Hereinafter, such registered area is referred to as registered area free from overlap.

When current registered areas free from overlap are used, flutter occurs in the neighborhood of the borderline between adjacent registered areas, and also traffic is concentrated for registration in radio base stations in the neighborhood of the borderline between adjacent registered areas. To solve these problems, a method has been proposed, in which overlap is permitted for the registered areas, that is, one radio zone can be covered by a plurality of registered areas, as disclosed in the specifications of Japanese Patent Application No. 39076/90 and Japanese Patent Application No. 99662/90. In this proposed method, each radio base station is notifying a registration unnecessary area signal based on its own radio zone to mobile stations present in its own radio zone. By the term "registration unnecessary area signal" is meant the group of identifications of radio zones, in which a mobile station not necessary to be registered have been previously registered (hereinafter referred to as "registered radio zones"). A mobile station which receives a registration unnecessary area signal notified from a radio base station, extracts the identification of the radio zone served by the radio base station from the registration unnecessary area signal. If the radio zone identification is not contained in route information stored in the mobile station memory, the terminal does nothing. If the radio zone identification is contained in the route information, it makes a check as to whether a registered radio zone identification stored in its memory is contained in the registration unnecessary area signal. If the registered radio zone is contained in the registration unnecessary area signal, the radio zone identification is added to the route information. If the registered radio zone identification is not contained in the registration unnecessary area signal, the mobile station transmits a registration signal to set a registered radio zone afresh, while resetting the route information and adding the radio zone identification to the route information. The radio base station is notifying registration unnecessary area signal at all times, and a radio base station receiving the registration signal and route information, transmits a registration confirmation signal to the mobile station which transmitted the registration signal. In addition, among its counters the counter of identifications of radio zones contained in the received route information is incremented by one, and the aggregate of n radio zone identifications and its own radio zone or zones is determined as a new registration unnecessary area in the order of greater counts. In this case, n is an adequate number and may be determined independently by each radio base station.

Upon terminating call at mobile station, the mobile switching center retrieves the radio zones, in which the called mobile station has been registered and transmits the identification of the mobile station and the identifications of the radio zones to all the radio base stations governed by the mobile switching center. The radio base station checks whether the received radio zone identification is contained in its own registered area data. If the radio zone identification is contained in the registered area data, the mobile station is called in the own radio zone. With this operation, the mobile station is once registered to be called in radio zones it passes without registration at all times. With this arrangement, the mobile switching center needs not hold register area information, thus permitting alleviation of the mobile switching center load.

In the above arrangement of making a call by simultaneous broadcast to all the radio base stations governed by the mobile switching center receiving the call to the mobile station, with increasing calls the broadcast data is increased to increase the process load on the radio base station which receives and processes the broadcast data. In addition, the mobile switching center can not make a call to more than one mobile switching center because no broadcast data can be transmitted to radio base stations governed by a different mobile switching center.

SUMMARY OF THE INVENTION

It is therefore an object of the present invention to provide a method of calling mobile stations moving in a plurality of radio zones by broadcasting.

According to the invention, by using a control signaling network comprising broadcast layers in a tree-like arrangement and, if necessary, means provided between the broadcast layers to check whether broadcast data is to be passed or discarded and linking a mobile switching center and radio base stations governed thereby, it is possible to selectively pass broadcast data through broadcast layers and reduce unnecessary broadcast data received in each radio base station. In addition, by linking a broadcast layer governed by a different mobile switching center and an own governed broadcast layer with a non-selective relay for non-conditionally relaying all broadcast data, the mobile switching center can transmit broadcast data to broadcast layers governed by a different mobile switching center. Further, where the mobile switching center has a broadcast data table, in which identifications of different mobile switching centers required to broadcast the broadcast data for mobile station call or identifications of broadcast layers governed by the different switch stations are stored, it is possible to retrieve different mobile switching centers for transmission thereto of broadcast data for calling a mobile station or the broadcast layers governed by the different mobile switching centers and transmit broadcast data to the radio base stations governed by the different mobile switching centers.

Other objects and features will be clarified from the following description.

BRIEF DESCRIPTION OF THE DRAWINGS

FIG. 5 is a view showing the data configuration of broadcast data sent from mobile switching center to radio base station and containing a radio zone identification as its destination;

FIG. 6 is a view showing the data configuration of broadcast data sent from mobile switching center to radio base station and containing a broadcast layer identification as its destination;

FIG. 14 is a view showing an example of the broadcast data containing a broadcast layer identification as its destination;

FIG. 15 is a view showing an example of the broadcast data containing a radio zone identification as its destination;

FIG. 18 is an example of the broadcast data containing a mobile switching center as its destination.

DETAILED DESCRIPTION OF THE PREFERRED EMBODIMENTS

Figure 1:
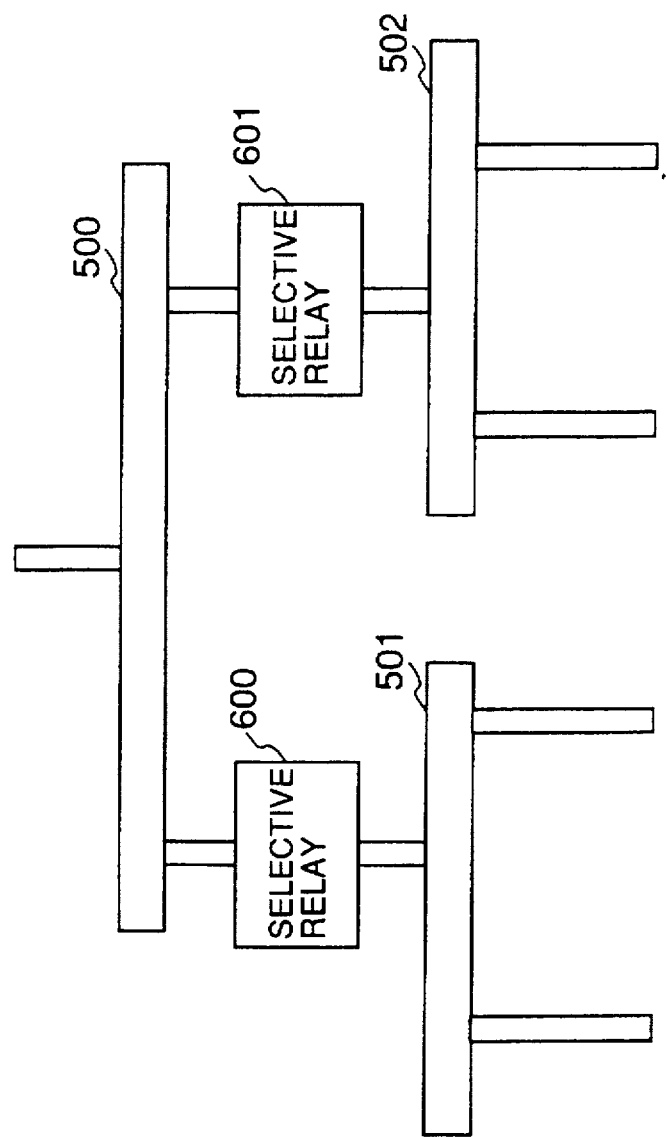
FIG. 1 is a schematic view showing an embodiment of the control signaling network according to a first aspect of the invention.

FIG. 1 shows an embodiment of the control signaling network according to the first aspect of the invention. Referring to the drawing, designated at 500 to 502 are broadcast layers, and at 600 and 601 selective relays. When the destination of broadcast data is a radio zone identification as shown in FIG. 5 and also when the destination of broadcast data is an identification of a broadcast layer in a lower one than the broadcast layer linked to a selective relay in the control signaling network as shown in FIG. 6, the selective relays relay the broadcast data to the broadcast layers linked to the lower one. At this time, if the destination is an identification of a broadcast layer directly linked the selective relays, that broadcast layer identification is removed, and broadcast data containing a radio zone identification as the destination is relayed to broadcast layers, as shown in FIG. 5. In this way, the broadcast data is relayed to all the radio base stations hierarchically lower in level than the pertinent selective relay. More specifically, in case when the destination of broadcast data flowing in the broadcast layer 500 is the identification of the broadcast layer 501, the selective relay 600 transfers data obtained by changing the destination to a radio zone identification contained in the broadcast data to the broadcast layer 501 because the broadcast layer 501 as the destination of the broadcast data is directly linked to it. In the selective relay 601, the transferred data is discarded because the broadcast layer 501 as the destination of the broadcast data is not linked to the lower layer belonging to the relay 601.

Figure 2:
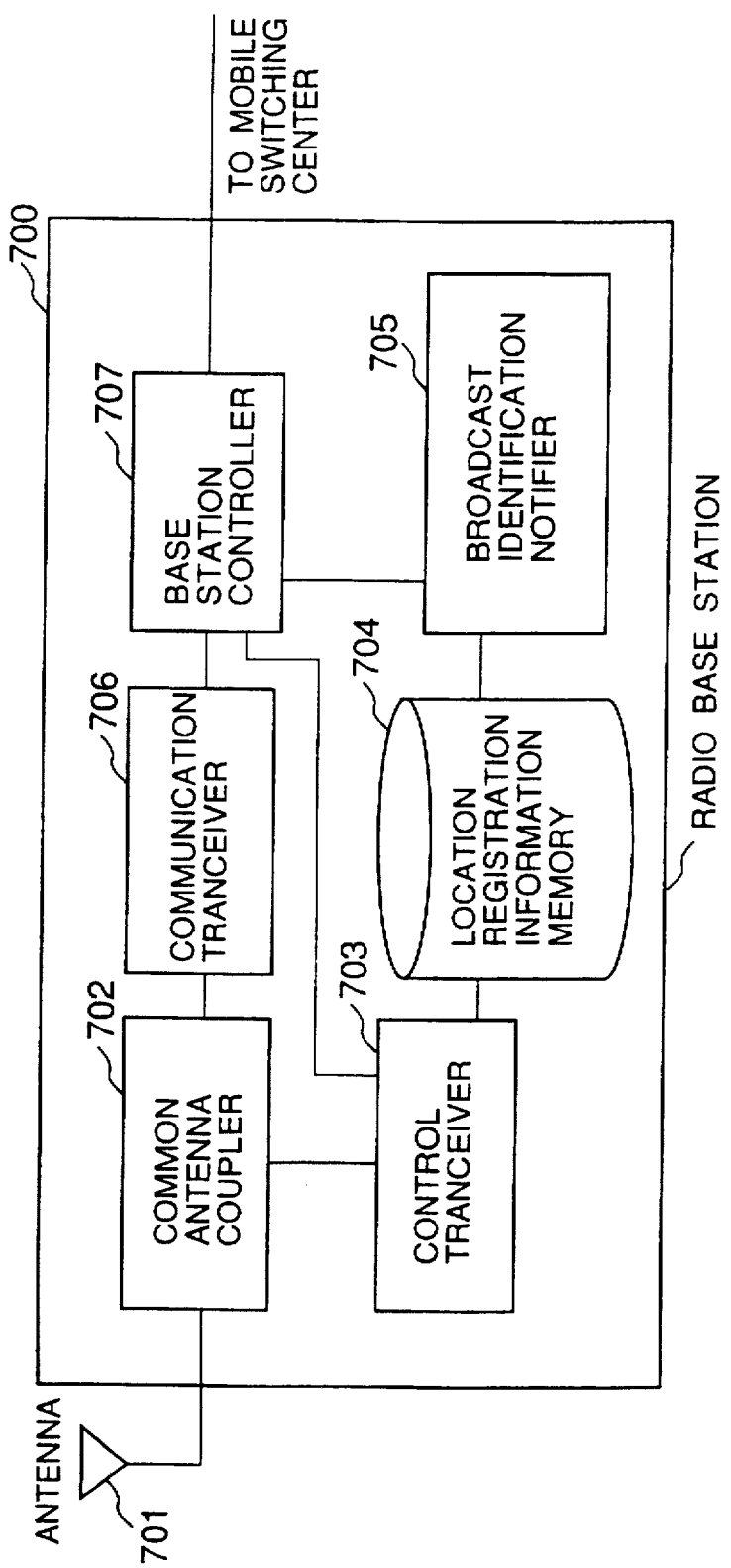
FIG. 2 is a view showing an embodiment of the radio base station according to a second aspect of the invention.

FIG. 2 shows an embodiment of the radio base station according to the second aspect of the invention. Referring to the FIG. 2, designated at 700 is the radio base station, which comprises an antenna 701, a common antenna coupler 702, a control transceiver 703, a location registration information memory 704, a broadcast identification notifier 705, a communication transceiver 706, and a base station controller 707.

The radio base station 700 transmits and receives the radio signal via the antenna 701 and common antenna coupler 702. The communication transceiver 706 and control transceiver 703, both linked to the common antenna coupler 702, transmit and receive signals with respect to mobile switches via the base station controller 707. Location registration area identifications are assigned to individual radio base stations. Location registration information memory 704 stores one or more registered area identifications as the location registration information notified to the radio zones served by each radio base station. The broadcast identification notifier 705 compares reach identification of a registered area stored in the location registration information memory 704 and each identification of the broadcast layer, to which the radio base station is linked, and if there is an identification of a registered area covering a radio zone served by a radio base station linked to a different broadcast layer, the notifier notifies the identification of the different broadcast layer and the registered area identification of its own station to the mobile switching centers.

Figure 3:
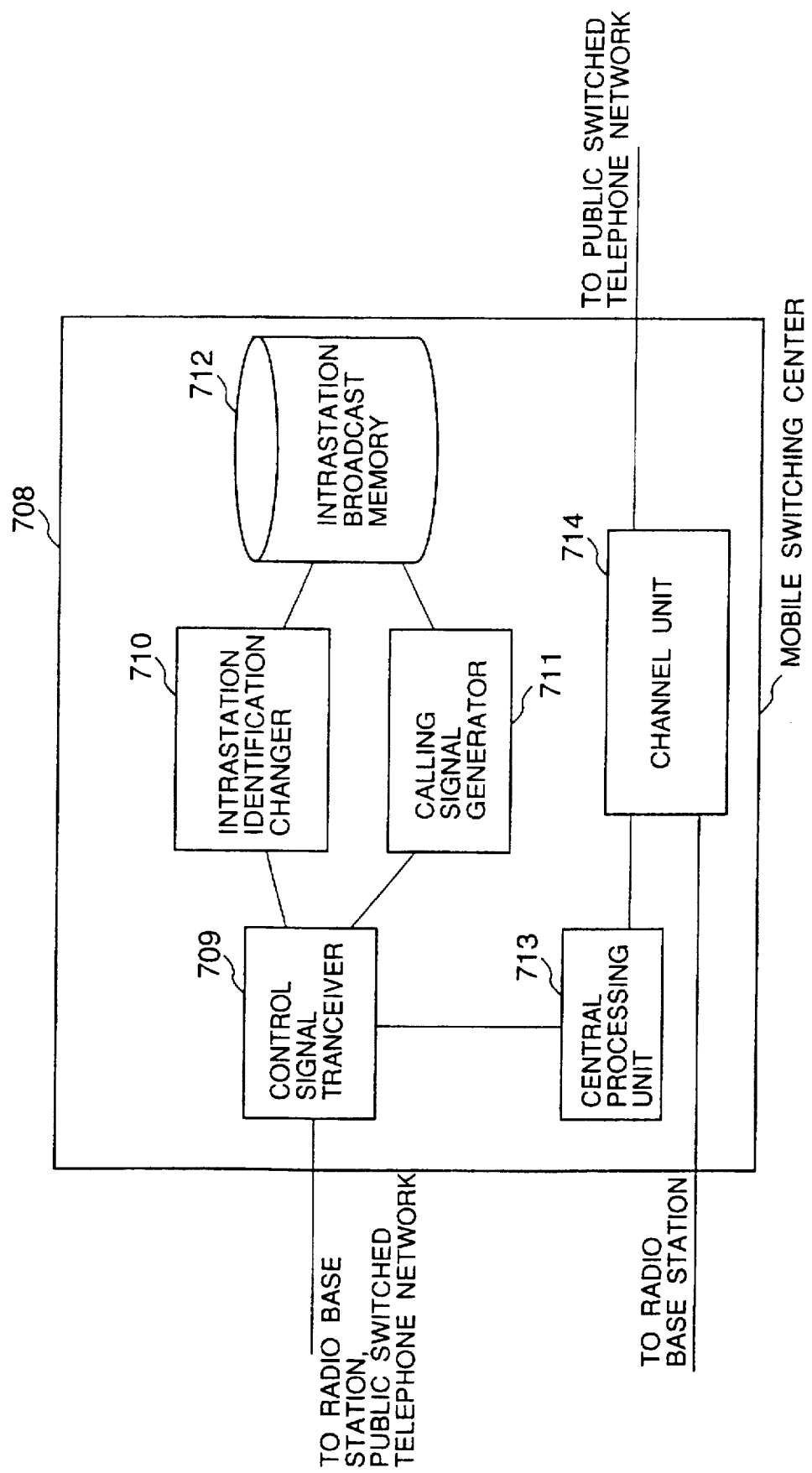
FIG. 3 is a view showing an embodiment of a mobile switching center according to a third aspect of the invention.

FIG. 3 shows an embodiment of the mobile switching enter according to the third aspect of the invention. Referring to FIG. 3, designated at 708 is the mobile switching center, which comprises a control signal transceiver 709, an intrastation identification changer 710, a calling signal generator 711, an intrastation broadcast memory 712, a central processing unit 713, and a channel unit 714.

The mobile switching center 708 connects the radio base stations and the public switched telephone network by using the channel unit 714, and it is controlled by the central processing unit 713. It transmits and receives control signals with its control signal transceiver 709. When it receives a control signal comprising a broadcast layer identification and a registered area identification from a radio base station, it notifies this to its intrastation identification changer 710 to change a set of broadcast layer identification and registered area identification stored in the broadcast data table in the intrastation broadcast memory 712. When a mobile station is called, the calling signal generator 711 generates a calling signal containing a destination as a broadcast layer identification retrieved from the registered area identifications stored in the intrastation broadcast memory 712, and the generated calling signal is sent out via the control signal transceiver 709 to the radio base stations.

Figure 4:
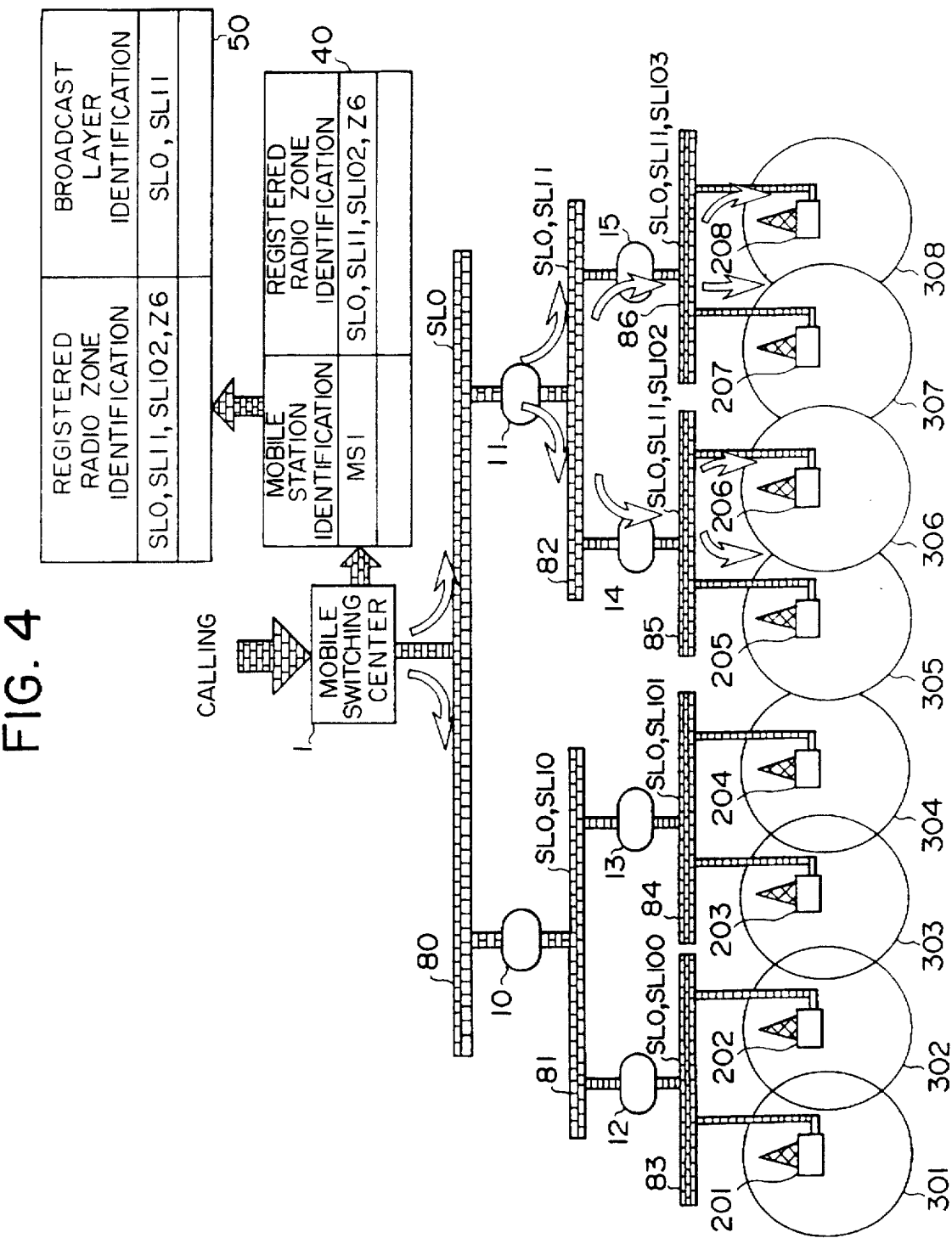
FIG. 4 is a schematic view showing a mobile station system, to which the control signaling network according to the first aspect of the invention, the radio base station according to the second aspect of the invention, and the mobile switching center according to the third aspect of the invention can be applied.

FIG. 4 shows an example of the mobile communication system, to which the control signaling network according to the first aspect of the invention, the radio base station according to the second aspect of the invention and the mobile switching center according to the third aspect of the invention can be applied, that is, all service areas are covered with a plurality of radio zones. In this system, each radio base station notifies a group of a certain number of registered area identifications, and each mobile switching center has information of the registration of mobile stations in radio base stations. When a mobile station is called, the mobile switching center places a call by broadcasting the call to its governed radio base stations.

Referring to FIG. 4, designated at 1 is a mobile switching center, at 10 to 15 selective relays, at 40 a registered data table, at 50 a broadcast data table stored in the intrastation broadcast memory, at 80 to 86 broadcast layers, and at 301 to 308 radio zones served by respective radio base stations 201 to 208. FIGS. 5 and 6 show data configurations of broadcast data sent from the mobile switching center to the radio base stations, the broadcast data containing radio zone identification and broadcast layer identification as the destination. The identifications of the broadcast layers 80 to 86 are respectively labeled SL0, SL0.SL10, SL0.SL11, SL0.SL100, SL0.SL101, SL0.SL11.SL102, and SL0.SL11.SL103.

Now, the embodiments of the control signaling network according to the first aspect of the invention, the radio base station according to the second aspect of the invention and the mobile switching center according to the third aspect of the invention will be described. In Embodiment 1, a location registered area is set for each radio zone, and location registered area identifications and radio zone identifications are in one-to-one correspondence relation to one another. Hereinunder, therefore, the radio zone identifications are dealt with as location registered area identifications. Embodiment 1 is based on the assumption that a mobile station having a mobile station identification MS1 is currently registered in the radio zone 306, that the radio zone 306, served by the radio base station 206, has an identification of SL0.SL11.SL102.Z6, and that this identification is stored in the location registration information memory 704 in each of the radio base stations 205 to 207 and notified to each radio zone.

When the radio base stations 205 to 207 notify the radio zone identification SL0.SL11.SL102.Z6, the broadcast identification notifier 705 compares the registered area identification assigned to its own station and the radio zone identification SL0.SL11.SL102.Z6. The radio base station 205 learns from the radio zone identification SL0.SL11.SL102.Z6 that the radio base station 206 identified by this identification is linked to the same broadcast layer 85 as it is. Thus, it notifies nothing. The radio base station 207, on the other hand learns from the radio zone identification noted above that the radio base station 206 that is identified is linked to the broadcast layer 85 which is different from the broadcast layer 86 to which it is linked. Thus, this station 207 notifies the identification SL0.SL11.SL103 of the broadcast layer 86 to which it is linked and the identification SL0.SL11.SL102.Z6 of the radio zone that is held to the mobile switching center 1. In the mobile switching center 1 receiving this notification, the broadcast layer identification SL0.SL11.SL103 is stored, under the control of the intrastation identification changer 710, in the column of the radio zone identification SL0.SL11.SL102.Z6 in the broadcast data table 50 stored in the intrastation broadcast memory 712. In this case, the identification SL10.SL11.SL103 of the stored broadcast layer and the radio zone identification SL0.SL11.SL102.Z6 identify the branches of the broadcast layer 82 identified by the identification SL0.SL11, and consequently the broadcast layer identification SL0.SL11 is stored in the column of the radio zone identification SL0.SL11.SL102.Z6 in the broadcast data table 50.

Now, a case will be considered when a call to the mobile station identified by the mobile station identification MS1 enters the mobile switching center 1. Arrows in FIG. 4 show the flow of broadcast data when a call to the mobile station with the mobile station identification MS1 enters the mobile switching center 1. More specifically, broadcast data, which is generated in the calling signal generator 711 in the mobile switching center 1 and contains the destination SL0.SL11, the registered radio zone identification SL0.SL11.SL102.Z6 of the mobile station identification MS1, is sent via the control signal transceiver 709 to the control signaling network to be received by the selective relays 10 and 11. In the selective relay 10, in which the identification SL0.SL11 of the broadcast layer 82 as the destination of the broadcast data does not identify its lower broadcast layer, the broadcast data is discarded. In the selective relay 11, in which the identification SL0.SL11 of the destination broadcast layer 82 identifies its lower layer, the broadcast data is relayed by changing the destination thereof to the radio zone identification SL0.SL11.SL102.Z6 contained in the data. The selective relays 14 and 15 relay the received broadcast data to the radio base stations 205 to 208 because the broadcast data destination is the radio zone identification SL0.SL11.SL102.Z6. In the radio base stations 205 to 207, the radio zone identification SL0.SL11.SL102.Z6 as the destination of the broadcast data is stored in the location registration information memory 704. Thus, these radio base stations receive the broadcast data and produce the call in their own radio zones. The radio base station 208, however, discards the broadcast data because of no storage of the radio zone identification SL0.SL11.SL102.Z6 in its memory.

Figure 7:
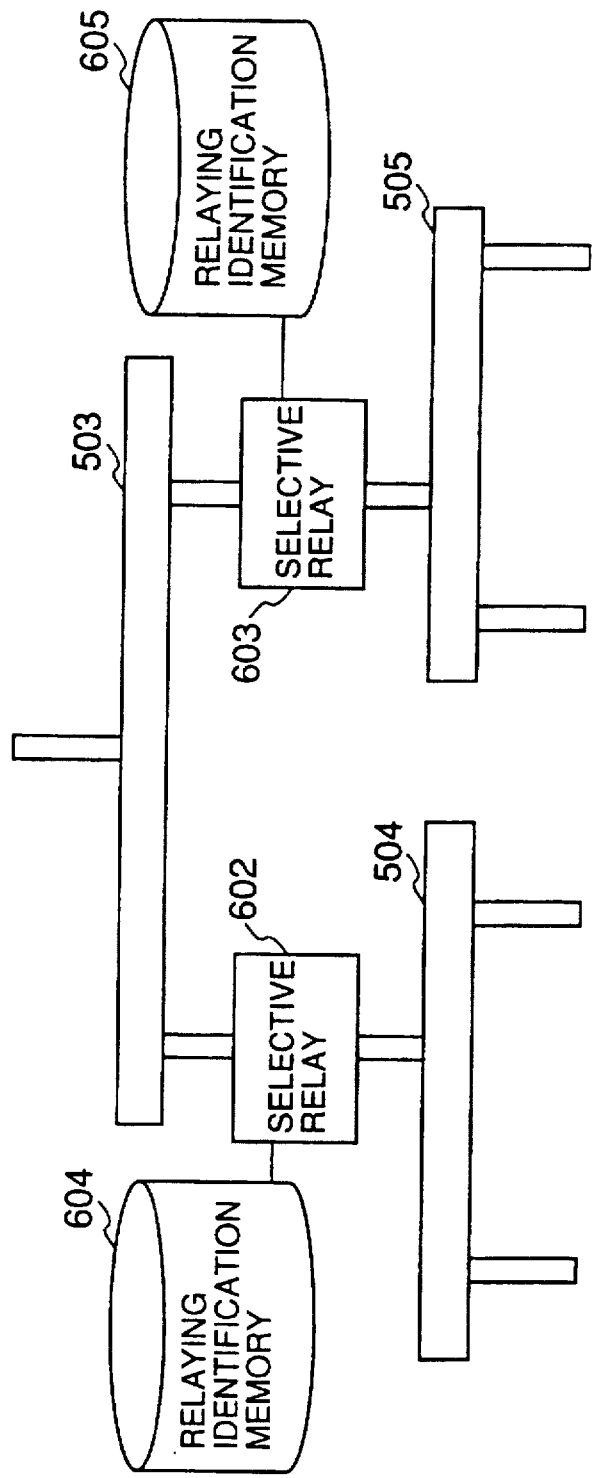
FIG. 7 is a schematic view showing an embodiment of the control signaling network according to a fourth aspect of the invention.

FIG. 7 shows an embodiment of the control signaling network according to the fourth aspect of the invention.

Referring to FIG. 7, designated at 503 to 505 are broadcast layers, at 602 and 603 selective relays, and 604 and 605 relaying identification memories. The selective relays 602 and 603 relay only the broadcast data, the destination of which are the identifications stored in the relaying identification memories 604 and 605, to the broadcast layers 504 and 505 via the broadcast layer 503. Consider now a registered area identification, which is stored in the relaying identification memory 604 but not stored in the other relaying identification memory 605. When broadcast data containing this registered area identification as the destination flows through the broadcast layer 503, it is relayed to the broadcast layer 504 by the selective relay 602, but it is discarded by the selective relay 603.

Figure 8:
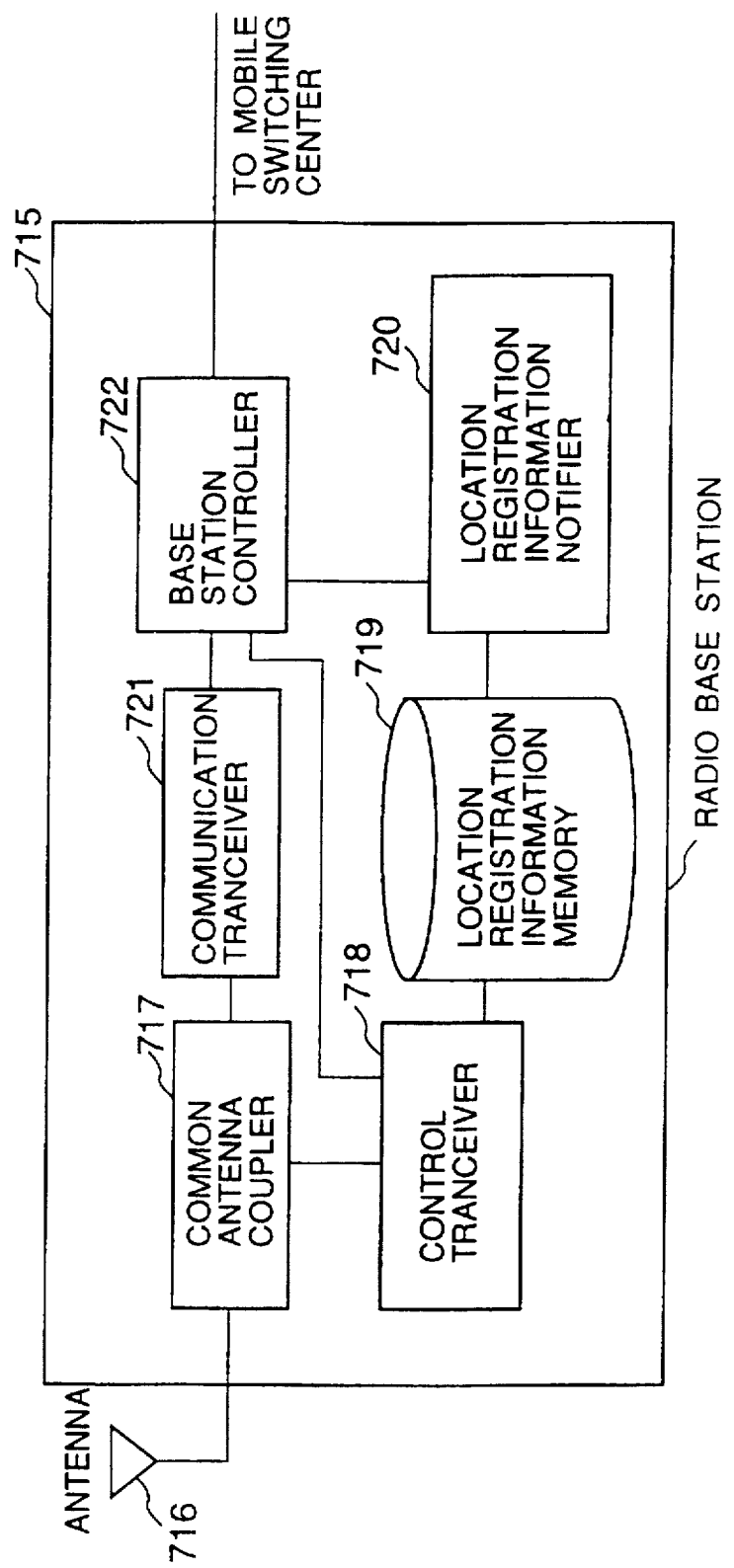
FIG. 8 is a view showing an embodiment of the radio base station according to a fifth aspect of the invention.

FIG. 8 shows an embodiment of the radio base station according to the fifth aspect of the invention. Referring to FIG. 8, designated at 715 is the radio base station, which comprises an antenna 716, a common antenna coupler 717, a control transceiver 718, a location registration information memory 719, a location registration information notifier 720, a communication transceiver 721, and a base station controller 722. The radio base station 715 transmits and receives radio signals via the antenna 716 and common antenna coupler 717. The communication and control transceivers 721 and 718 are linked to the common antenna coupler and transmit and receive signals with respect to the mobile switching center via the base station controller 722. A registered area identification is assigned to each radio base station, and the location registration information memory 719 store one or more registered area identifications notified to the radio zone served by each radio base station. The location registration information notifier 720 compares each registered area identification stored in the location registration information memory 719 and the identification of the broadcast layer, to which the present radio base station is linked. If a registered area identification of a radio base station linked to a different broadcast layer is found, it is notified to the mobile switching center via the base station controller 722.

Figure 9:
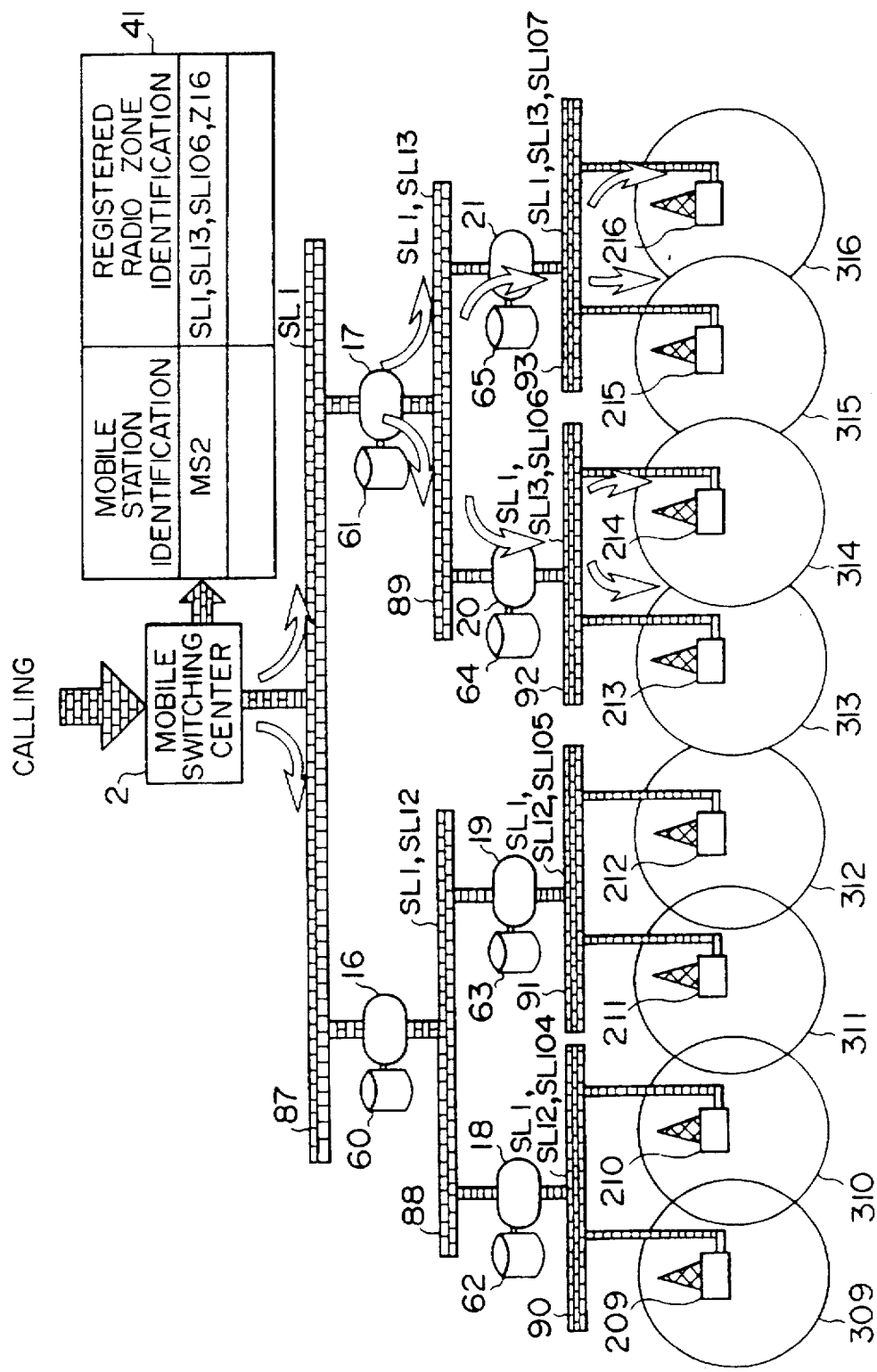
FIG. 9 is a schematic view showing a mobile communication system, to which the control signaling network according to the fourth aspect of the invention and the radio base station according to the fifth aspect of the invention can be applied.

FIG. 9 shows a schematic view of a mobile communication system, to which the control signaling network according to the fourth aspect of the invention and the radio base station according to the fifth aspect of the invention are applicable. Referring to FIG. 9, designated at 2 is a mobile switching center, at 16 to 21 selective relays for selectively passing only necessary data, at 60 to 65 relaying identification memories, 87 to 93 broadcast layers, and 309 to 316 radio base stations 209 to 216. Designated at SL1, SL1.SL12, SL1.SL13, SL1.SL12.SL104, S1.SL12.SL105, SL1.SL13.SL106 and SL1.SL13.SL107 are identifications of the broadcast layers 87 to 93.

Embodiment 2 of the control signaling network according to the fourth aspect of the invention and the radio base station according to the fifth aspect of the invention will now be described with reference to FIGS. 8 and 9. In Embodiment 2, the registered area is set for each radio zone, that is, the registered area identifications and the radio zone identifications are in one-to-one-correspondence to one another. Hereinunder, the radio zone identifications are dealt with as registered area identifications.

In Embodiment 2, it is assumed that a mobile station identified by a mobile station identification MS2 is currently registered in the radio zone 314, that the radio zone 314 served by the radio base station 214 is identified by a identification SL1.SL13.SL106.Z16 and that this identification is stored in the location registration information memory 719 in each of the radio base stations 213 to 215 and notified to each radio zone. When the radio base stations 213 to 215 are notifying the radio zone identification SL1.SL13.SL106.Z16, each radio base station is receiving the identification with the function of the location registration information notifier 720. The radio base station 213 learns from the radio zone identification SL1.SL13.SL106.Z16 that the radio base station 214 pertaining to this radio zone identification is linked to the same broadcast layer 92 as its own, so that it notifies nothing. The radio base station 215, on the other hand, learns from the radio zone identification SL1.SLL13.SL106.Z16 being notified that the radio base station pertaining to this identification is linked to the broadcast layer 92 which is different from its own broadcast layer 93. Thus, it notifies the notified radio zone identification SL1.SL13.SL106.Z16 to the mobile switching center 2 via the base station controller 722. The selective relay 21 receiving the notification from the radio base station 215 stores the broadcast data containing the radio zone identification SL1.SL13.SL106.Z16 as the destination in the relaying identification memory 65 for relaying and relays the notification data from the radio base station to the selective relay 17. The selective relay 17 provides link functions, and the broadcast data containing the radio zone identification SL1.SL13.SL106.Z16 as the destination is stored for relaying. It is postulated, however, that at the instant when the radio base station 214 is linked, the relaying identification memories 61 and 64 linked to the selective relays 17 and 20 in the layer above the radio base station 214 are notified from the registered area identification notifier of the radio base station and that the radio zone identification SL1.SL13.SL106.Z16 pertaining to the radio base station 214 is stored.

Now, a case will be considered, in which a call to the mobile station identified by the mobile station identification MS2 enters the mobile switching center 2. Arrows in FIG. 9 show the flow of the broadcast data when the call to the mobile station with the mobile station identification MS2 enters the mobile switching center 2. The mobile switching center 2 retrieves from the registration data 41 that the mobile station with the mobile station identification MS2 is registered with SL1.SL13.SL106.Z16, and sent out broadcast data for the call with destination as SL1.SL13.SL106.Z16. This broadcast data for the call is received by the selective relays 16 and 17. In the selective relay 16, in which the destination SL1.SL13.SL106.Z16 of the broadcast data is not stored as the relaying destination in the relaying identification memory 60, the broadcast data is discarded. In the selective relay 17, in which the destination SL1.SL13.SL106.Z16 of the broadcast data is stored as the relaying destination in the relaying identification memory 61, the broadcast data is relayed to the broadcast layer 89 to be received by the selective relays 20 and 21. In the selective relays 20 and 21, the destination SL1.SL13.SL106.Z16 of the broadcast data is stored in the relaying identification memories 64 and 65. Thus, these relays relay the broadcasted data to be received in the radio base stations 213 to 216. In the radio base stations 213 to 215, the radio zone identification SL1.SL13.SL106.Z16 as the destination of the broadcast data is stored. Thus, these radio base stations receive the broadcast data, and provide their own radio zones with a call to the mobile station identified by the mobile station identification MS2. The radio base station 216, however, has no storage of the radio zone identification SL1.SL13.SL106.Z16 in its registered area identification memory, and hence it discards the broadcast data.

Figure 10:
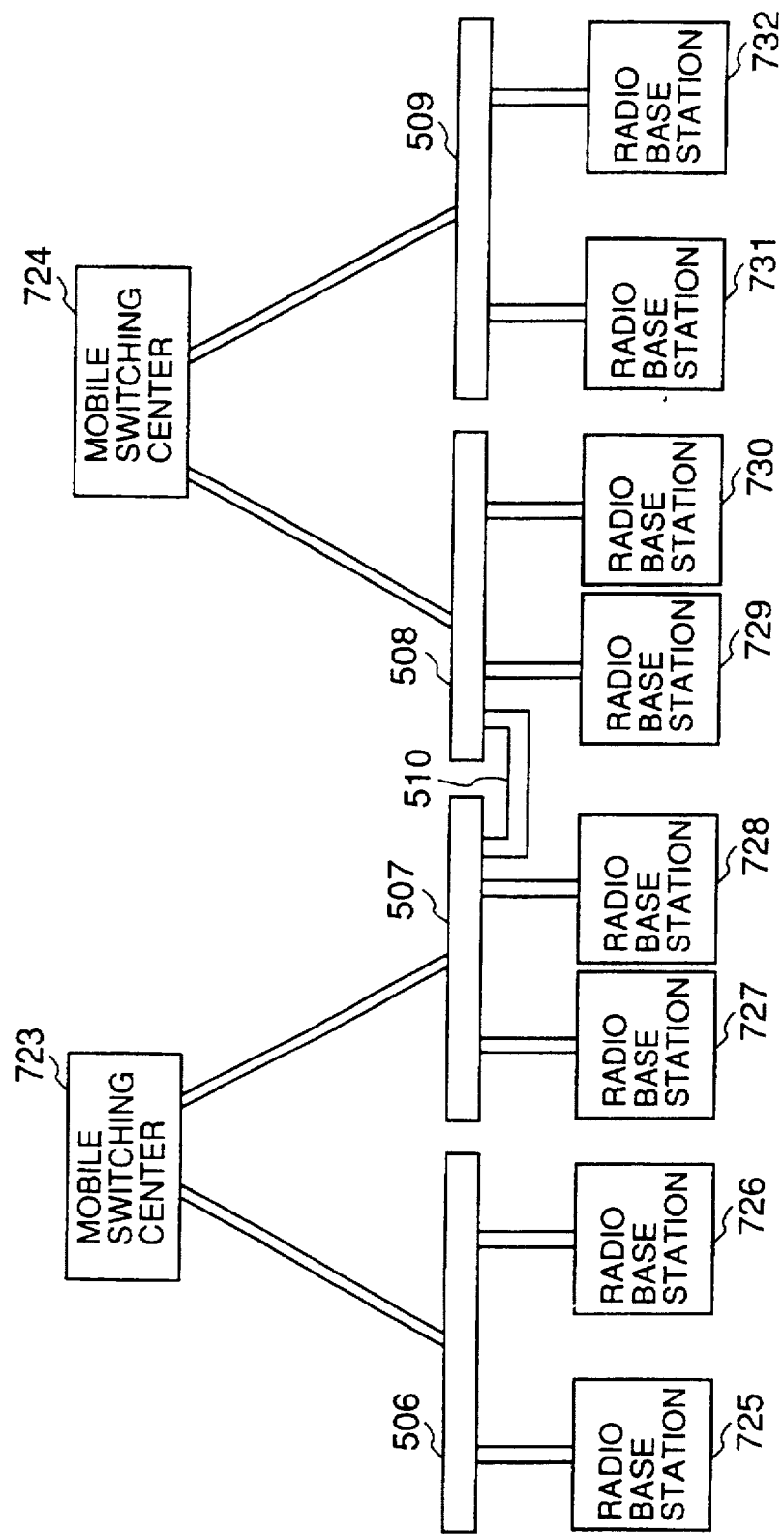
FIG. 10 is a schematic view showing an embodiment of the control signaling network according to a sixth aspect of the invention can be applied.

FIG. 10 shows an embodiment of the control signaling network according to the sixth aspect of the invention. Referring to FIG. 10, designated at 506 to 509 are broadcast layers, at 510 a non-selective relay, at 723 and 724 mobile switching centers, and 725 to 732 radio base stations.

Figure 11:
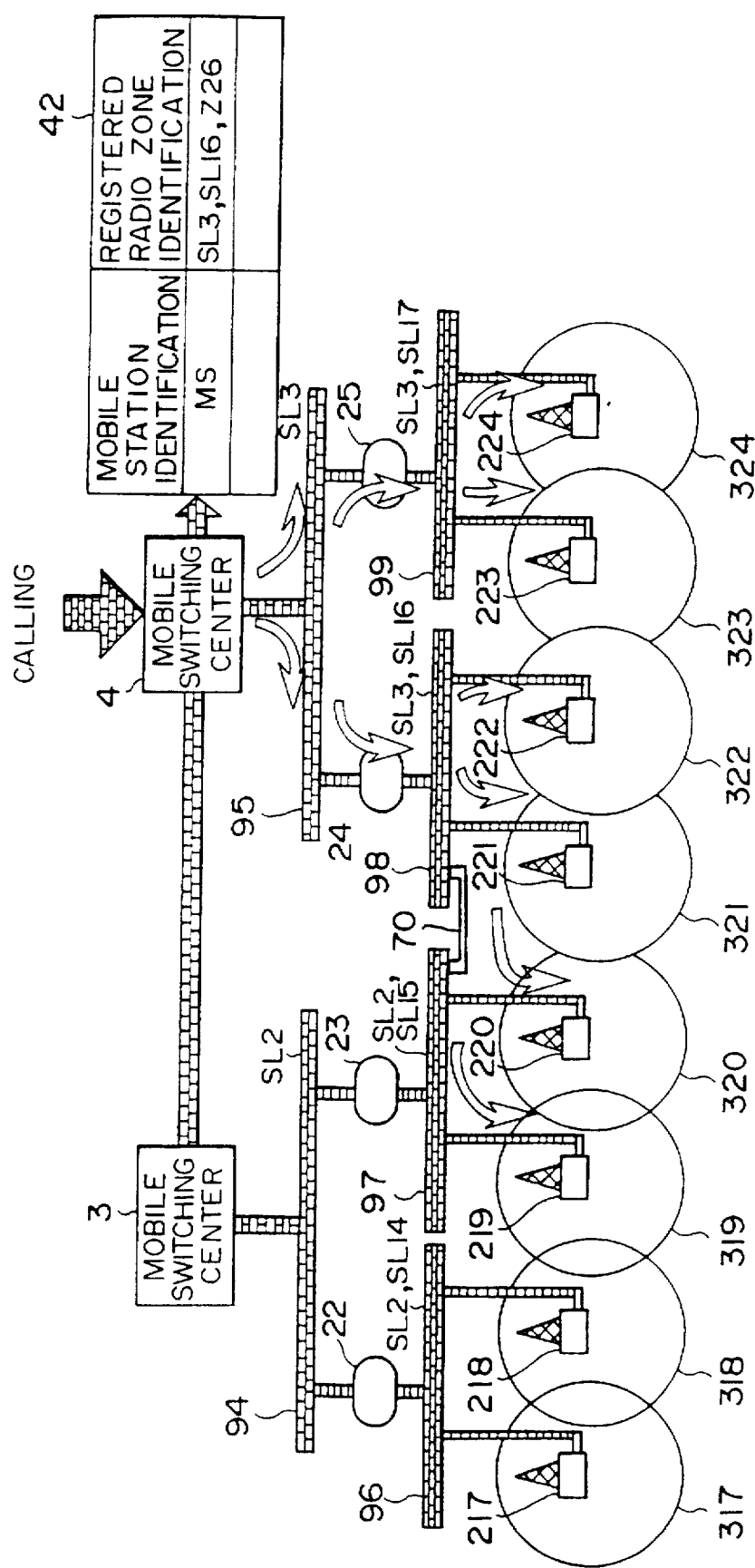
FIG. 11 is a schematic view showing a mobile communication system, to which the control signaling network according to the sixth aspect of the invention can be applied.

FIG. 11 shows a mobile communication system, to which the control signaling network according to the sixth aspect of the invention can be applied. It is assumed that the mobile switching centers and the radio base stations are linked by the control signaling network according to the first aspect of the invention. Referring to FIG. 11, designated at 3 and 4 are mobile switching centers, 22 to 25 are selective relays, at 42 registered data table, at 70 a non-selective relay, 94 to 99 broadcast layers, and 317 to 324 radio zones served by radio base stations 217 to 224. Designated at SL2, SL3, SL2.SL14, SL2.SL15, SL3.SL16 and SL3.SL17 are identifications of the broadcast layers 94 to 99.

Now, Embodiment 3 of the control signaling network according to the sixth aspect of the invention will be described with reference to FIG. 11. In Embodiment 3, a registered area is set for each radio zone, that is, registered area identifications and radio zone identifications are in one-to-one correspondence to one another. Hereinunder, the radio zone identifications are dealt with as the registered area identifications.

In Embodiment 3, it is assumed that the radio zone 322 served by the radio base station 222 is identified by the identification SL3.SL16.Z26, which is held by the radio base stations 220 to 224 and that a mobile station with a mobile station identification MS3 is currently registered in the radio zone 322.

A case will now be considered, in which a call to the mobile station with the mobile station identification MS3 enters the mobile switching center 4. Arrows in FIG. 11 show the flow of the broadcast data for calling when a call to the mobile station with the mobile station identification MS3 enters the mobile switching center 4. More specifically, the mobile switching center 4, receiving the call to the mobile station having the mobile station identification MS3, retrieves the radio zone, in which the mobile station is registered, with its own registered data table 42 and obtains the radio zone identification SL3.SL16.Z26. The mobile switching center 4 obtaining the registered radio zone identification SL3.SL16.Z26 describes the radio zone identification SL3.SL16.Z26 as the destination of the broadcast data. Since destination of the broadcast data is a radio zone identification, the selective relays 24 and 25 receiving the broadcast data non-conditionally relay the broadcast data to the broadcast layers 98 and 99. The broadcast data relayed to the broadcast layer 99 is received by the radio base stations 223 and 224 linked thereto. The identification SL3.SL16.Z26 contained in the broadcast data is along the radio zone identifications notified by the radio base stations 223 and 224. Thus, a call to the mobile station with the mobile station identification MS3 is issued to the radio zones 323 and 324. The broadcast data relayed to the broadcast layer 98 is likewise received by the radio base stations 221 and 222, which thus issue a call to the radio zones 321 and 322 to be relayed by the non-selective relay 70 to the broadcast layer 97. The radio zone identification SL3.SL16.Z26 contained in the broadcast data relayed to the broadcast layer 97 is among the radio zone identifications notified by the radio base station 220. Thus, a call is issued to the radio zone 320 served by the radio base station 220. However, the radio zone identification SL3.SL16.SL26 is not among the radio zone identifications notified by the radio base station 219. Thus, no call is issued to the radio zone 319.

Figure 12:
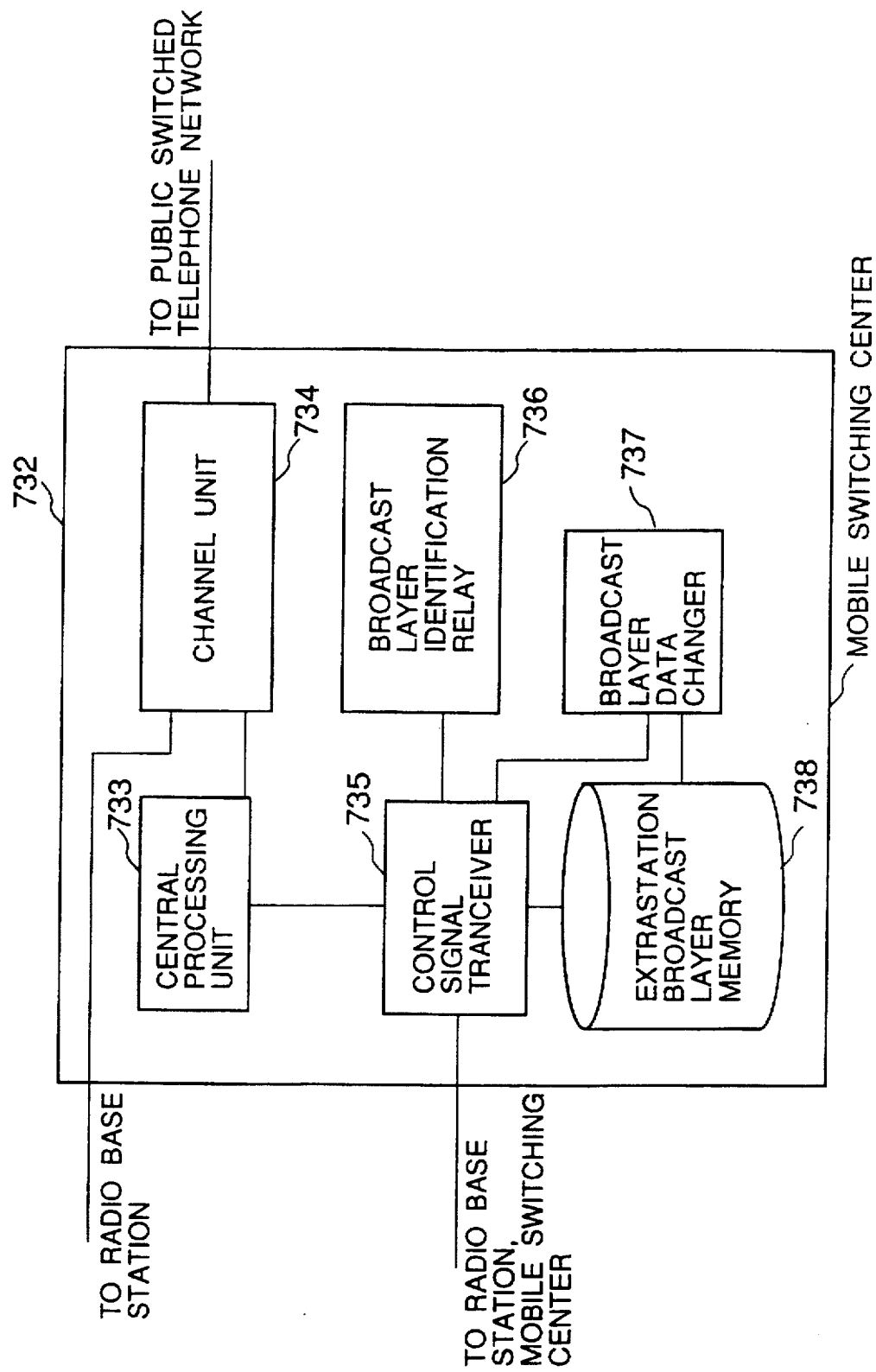
FIG. 12 is a view showing an embodiment of the mobile switching center according to a seventh aspect of the invention.

FIG. 12 shows an embodiment of the mobile switching center according to the seventh embodiment of the invention. Referring to FIG. 12, designated at 732 is the mobile switching center, which comprises a central processing unit 733, a channel unit 734, a control signal transceiver 735, a broadcast layer identification relay 736, a broadcast layer data changer 737 and an extrastation broadcast layer memory 738.

The mobile switching center 732 link the radio base stations and the public switched telephone network using the channel unit 734. The mobile switching center transmits and receives control signals by the agency of the control signal transceiver 735. Also, when it receives from a different mobile switching center a control signal containing the different switch station broadcast layer identification and the registered area identification, it notifies this to the broadcast layer data changer 737 and changes the set of registered area identification and broadcast layer identification stored as broadcast data table in the extrastation broadcast memory 738. When the broadcast layer identification relay 736 receives from its governed radio base station a control signal the registered area identification and the identification of a broadcast layer governed by a different mobile switching center, it transmits the signal to the other mobile switching center via the control signal transceiver 735.

Figure 13:
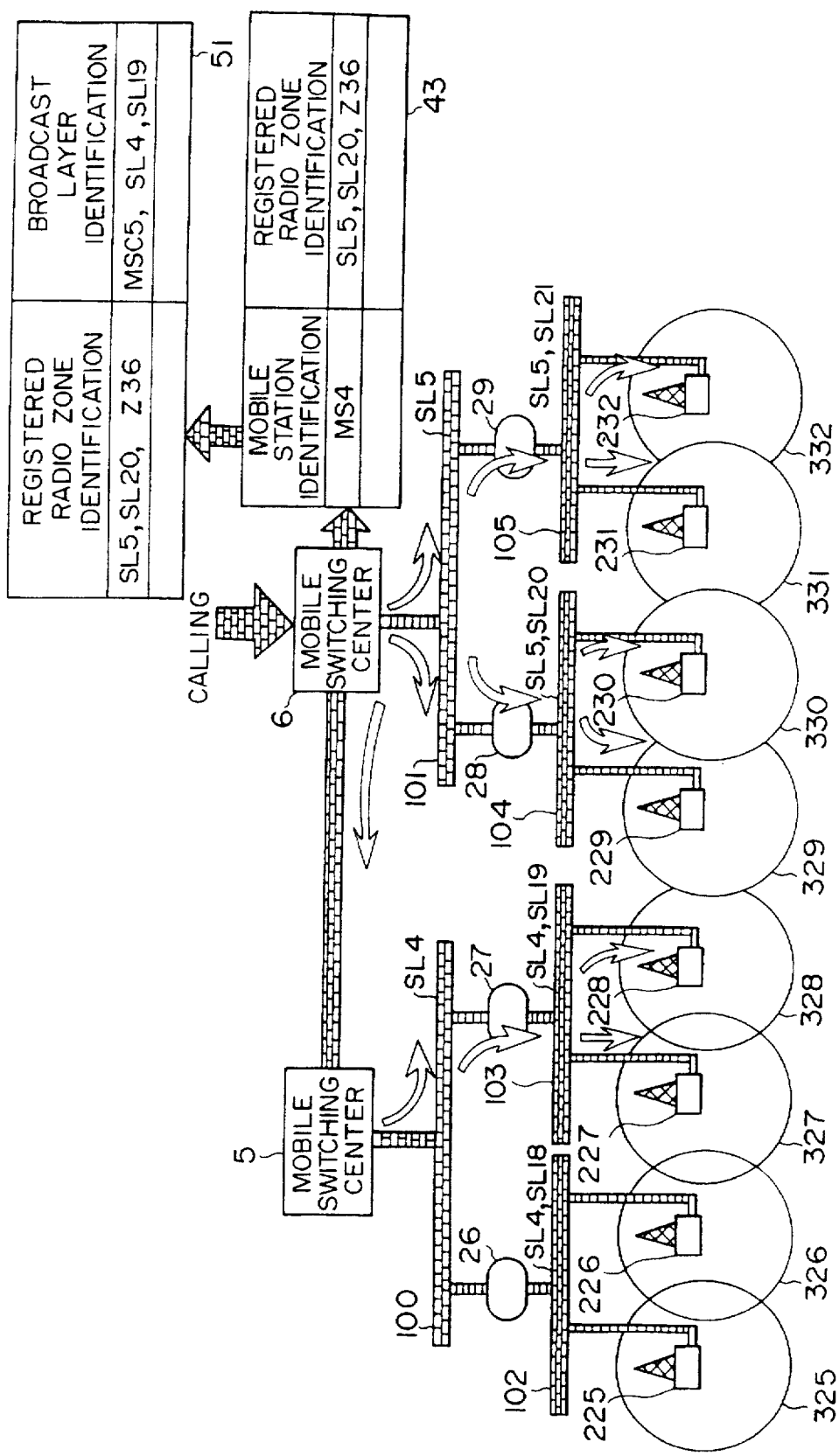
FIG. 13 is a schematic view showing a mobile communication system, to which the mobile switching center according to the seventh aspect of the invention can be applied.

FIG. 13 shows a mobile communication system, to which the mobile switching center according to the seventh aspect of the invention can be applied. Referring to the Figure, designated at 5 and 6 are mobile switching centers, at 26 to 29 selective relays, at 43 a registered data table stored in the broadcast layer memory, at 51 a broadcast data table, at 105 to 109 broadcast layers, and at 325 to 332 radio zones served by radio base stations 225 to 232. Designated at MSC (Mobile switching center) 5 and MSC 6 are identifications of the mobile switching centers 5 and 6, and at SL4, SL5, SL14, SL18, SL4, SL19, SL5.SL20 and SL5.SL21 are identifications of broadcast layers 100 to 105. FIG. 14 shows an example of broadcast data containing a broadcast layer identification as the destination, and FIG. 15 is an example of broadcast data containing a radio zone identification as the destination.

Embodiment 4 of the mobile switching center according to the seventh aspect of the invention will now be described with reference to FIGS. 12 and 13. In this embodiment, a registered area is set for each radio zone, that is, registered area identifications and radio zone identifications are in one-to-one correspondence to one another. Hereinafter, the radio zone identifications are dealt with as the registered area identifications.

In Embodiment 4, it is assumed that the radio base station 230 is identified by the identification SL5.SL20.Z36, which is being broadcast by the radio base stations 228 to 232 and that the a mobile station with an identification MS4 is registered in the radio zone 330.

Since the radio base station 228 is broadcasting the radio zone identification SL5.SL20.Z36 which is not under the government of the mobile switching center 5 governing it, it notifies this radio zone identification SL5.SL20 .Z36 together with the identifications SL5.SL20.Z36 and SL4.SL19 identifying the broadcast layer 103, to which it is linked, to the mobile switching center 5. The notified mobile switching center 5 determines in its broadcast layer identification relay 736 and from the radio zone identification SL5.SL20.Z36 that this radio zone is governed by the mobile switching center 6, and it delivers a signal containing the identification SL4.SL19 of the broadcast layer 103 with addition of its own identification MSC5 and the radio zone identification SL5.SL20.Z36 to other mobile switching centers via the control signal transceiver 735. The notified mobile switching center 6 describes the notified identification MSC5.SL4.SL19 in the column of the radio zone identification S5.SL20.Z36 in the broadcast layer data table stored in the extrastation broadcast layer memory 738 by using the function of the broadcast layer data changer 737.

Now, a case will be considered, in which a call to the mobile station with the mobile station identification MS4 enters the mobile switching center 6. Arrows shown in FIG. 13 show the flow of broadcast data when a call placed to the mobile station with the mobile station identification MS4 enters the mobile switching center 6. More specifically, the mobile switching center 6, receiving the call directed to the mobile station with the mobile station identification MS4, retrieves its own registered data table 43 for the radio zone, in which the mobile station is registered, and thus obtains the registered radio zone identification SL5.SL20.Z36. Also, it retrieves the broadcast data table 51 stored in the extrastation broadcast layer memory 738 to check whether the call broadcast data for the radio zone identification SL5.SL20.Z36 also has to be delivered to broadcast layers governed by other mobile switching centers, and thus it sends out the broadcast data to the broadcast layer 103 identified by the broadcast layer identification SL4.SL19 area governed by the mobile switching center 5 having the identification MSC5. The radio base stations governed by the mobile switching center 6 should all hold the radio zone identification SL5.SL20.Z36 and provide the broadcast data to their governed lowest layer broadcast layers. Thus, the radio zone identification SL5.SL20.Z36 is described as the broadcast data destination for simultaneous broadcast to the governed radio base stations. The selective relays 28 and 29, receiving the broadcast data, non-conditionally relay the data to the broadcast layers 104 and 105 because the destination of the data is the radio zone identification. The broadcast data relayed to the broadcast layer 104 is received by the radio base stations 229 and 230 linked to these broadcast layers. Because the identification SL5.SL20.Z26 contained in the broadcast data is among the radio zone identifications notified by both the radio base stations 229 and 230, these radio base stations issue a call to the mobile station with the mobile station identification MS4 to the radio zones 329 and 330. Likewise, the broadcast data relayed to the broadcast layer 105 is received by the radio base stations 231 ad 232, which issue a call to the radio zones 331 and 332. Meanwhile, the broadcast data transmitted from the mobile switching center 6 to the mobile switching center 5 contains the identification 103 of the broadcast layer 103 governed by the mobile switching center 5 as the destination in addition to the identification SL5.SL20.Z36 of the broadcast layer 103 governed by the mobile switching center 5 in addition to the registered radio zone identification SL5.SL20.Z36 and mobile station identification MS4. The broadcast data relayed from the mobile switching center 5 to the broadcast layer 100 is received by the selective relays 26 and 27. The selective relay 26 determined that the destination of the received broadcast data is identified by the identification SL4.SL19 of the broadcast layer 103 which is not under its government, and hence it discards the received broadcast data. The selective relay 27, on the other hand, determines that the destination of the received broadcast data is identified by the identification SL4.SL19 of the broadcast layer 103, to which it is linked directly, and thus it relays the received broadcast data to the broadcast layer 103 by changing the destination of the data from the identification SL4.SL19 of the broadcast layer 103 to the radio zone identification SL15.SL20.Z36 of the data. The radio base station 228, receiving the broadcast data relayed to the broadcast layer 103, issues a call to the radio zone 328 governed by the radio base station 228 because the radio zone identification SL5.SL20.Z36 contained in the broadcast data is among the radio zone identifications notified by radio base station. However, it does not issue any call to the radio zone 327 because the radio zone identification SL5.SL20.Z26 is not among the radio zone identifications notified by the radio base station 227.

Figure 16:
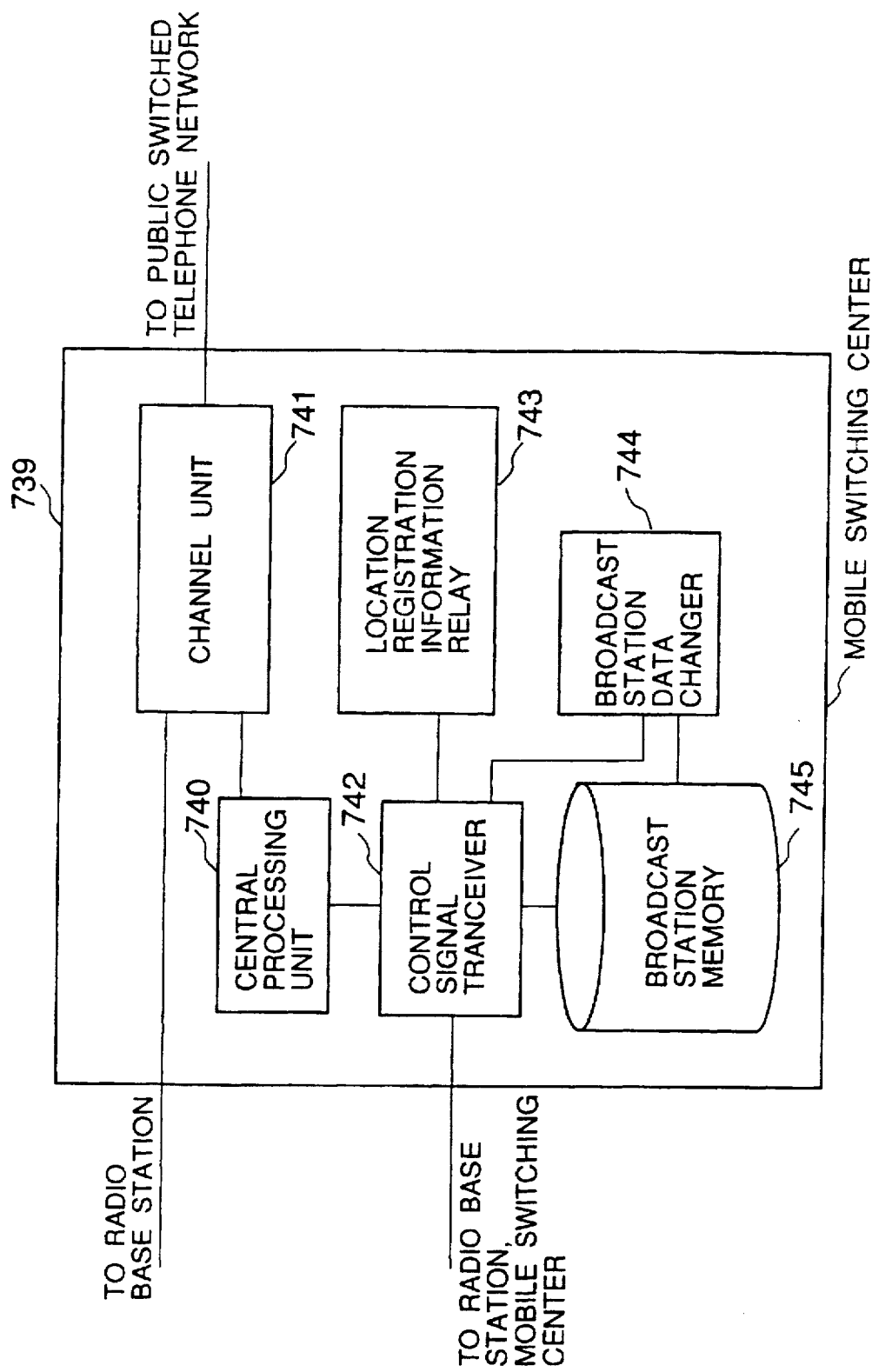
FIG. 16 is a view showing an embodiment of the mobile switching center according to an eighth aspect of the invention.

FIG. 16 shows an embodiment of the mobile switching center according to the eighth aspect of the invention. Referring to the drawing, designated at 739 is a mobile switching center, which comprises a central processing unit 740, a channel unit 741, a control signal transceiver 742, a location registration information relay 743, a broadcast station data changer 744, and a broadcast station memory 745. The mobile switching center 739 link the radio base stations and the public switched telephone network by using the channel unit 741, and is controlled by the control processing unit. In addition, it transmits and receives control signals with respect to the control signal transceiver 742. However, when it receives from a different mobile switching center a control signal containing an identification of a different mobile switching center and a registered area identification, its signal is notified to the broadcast station data changer 744, and the broadcast station memory 745 changes the set of the registered area identification mobile switching center identification stored as broadcast data table. When receiving a control signal comprising an identification of a registered area governed by a different mobile switching center from a governed radio base station, the location registration information relay 743 transmits the control signal to the different mobile switching center via the control signal transceiver 742. When a control signal containing own mobile switching center identification and the identification of a governed registered area is received, the registered area identification relay 743 changes the designation of the control signal from own mobile switching center identification to the registered area identification.

Figure 17:
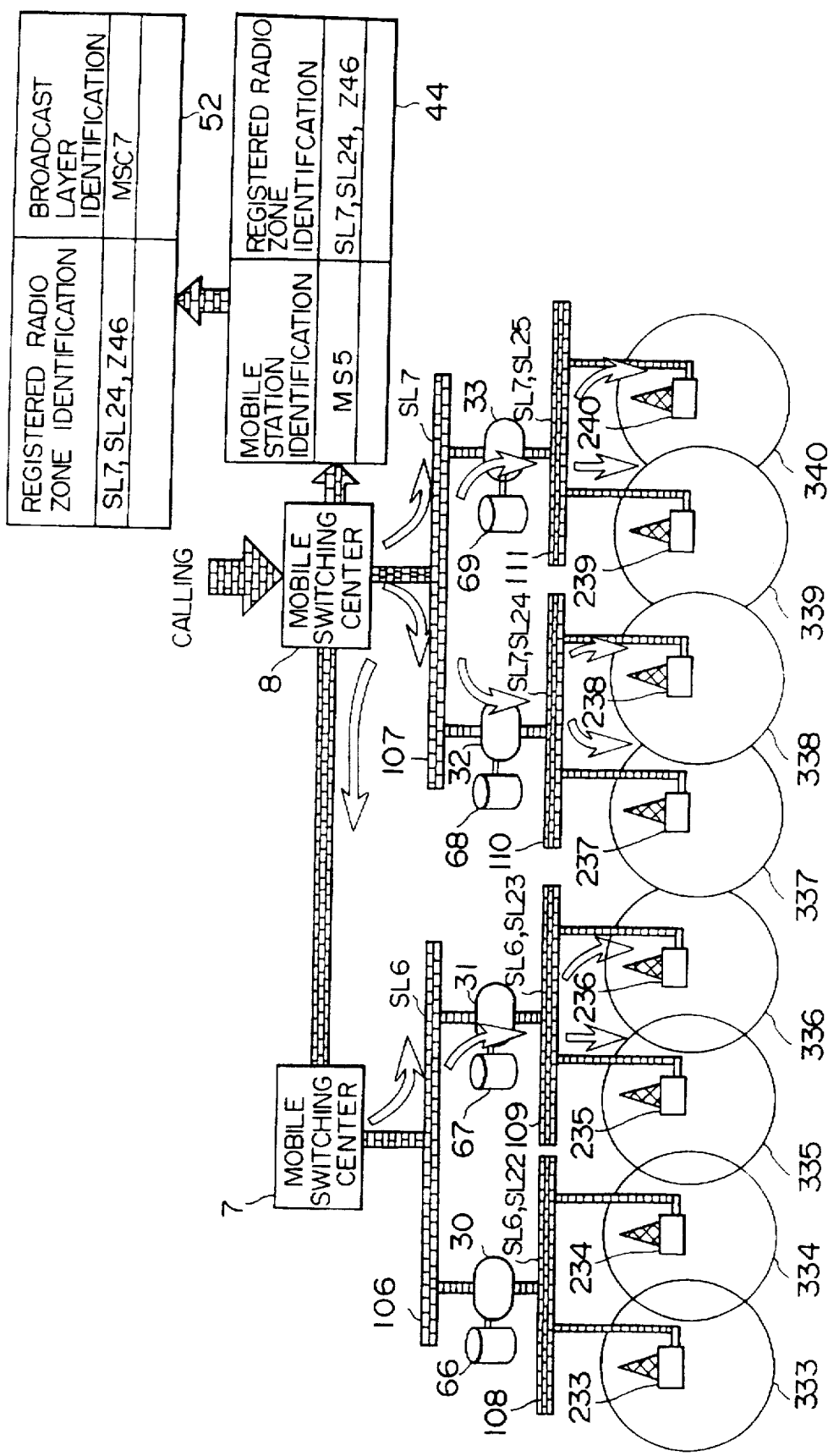
FIG. 17 is a schematic view showing a mobile communication system, to which the mobile switching center according to the eighth aspect of the invention can be applied.

FIG. 17 shows a mobile communication system, to which the mobile switching center according to the eighth aspect of the invention can be applied. Referring to FIG. 17, designated at 7 and 8 are mobile switching centers, at 30 to 33 selective relays, at 44 a registered area table stored in the broadcast station memory, at 52 a broadcast data table, at 66 to 69 relaying identification memory, 106 to 111 broadcast layers, and 333 to 340 radio zones served by radio base stations 233 to 240. Designated at MSC 7 and MSC 8 are identifications of the mobile switching centers 7 and 8, at SL6, SL7, SL6.SL22, SL6.SL23, SL7.SL24 and SL7.SL25 are identifications of broadcast layers 106 to 111. FIG. 18 shows an example of broadcast data containing a mobile switching center identification as the destination.

Now, Embodiment 5 of the mobile switching center according to the eighth aspect of the invention will be described with reference to FIGS. 16 and 17. In Embodiment 5, a registered area is set for each radio zone, that is, the registered area identifications and the radio zone identifications are i n one-to-one correspondence to one another. Hereinunder, the radio zone identifications are dealt with as registered area identifications.

In Embodiment 5, it is assumed that the radio zone 338 served by the radio base station 238 is identified by the identification SL7.SL24.Z46 which is being notified by the radio base stations 236 to 240 and that a mobile station with a mobile station identification MS5 is currently registered in the radio zone 338.

Since the radio base station 236 is notifying the radio zone identification SL7.SL24.Z46 which is not under the government of the mobile switching center 5 governing it, it 34 notifies this identification to the mobile switching center 7. When the notified signal passes through the selective relay 31, the selective relay 31 stores the radio zone identification SL7.SL24.Z46 in the notified signal in the relaying identification memory 67. The notified mobile switching center 7 determines in the registered area identification relay 743 and from the radio zone identification SWL7.SL24.Z46 that the mobile switching center 8 is covering the radio zone. Thus, it notifies the radio zone identification SL7.SL24.Z46 with addition of its own identification MSC7 to the mobile switching center 8 via the control signal transceiver 742. The notified mobile switching center 8 notifies the notified mobile switching center identification MSC7 in the column of the radio zone identification SL7.SL24.Z46 in the broadcast layer data table stored in the broadcast station memory 745. It is postulated that the identification SL7.SL24.Z4 has already been stored in the relaying identification memories 68 and 69 governed by the switch station 8.

A case will now be described, in which a call to the mobile station with the mobile station identification M35 is given to the mobile switching center 8. Arrows in FIG. 17 show the flow of broadcast data when the call to the mobile station with the mobile station 8 is given to the mobile station identification MS5. More specifically, the mobile switching centers receiving the call to the mobile station with the mobile station identification MS5, retrieve their own registered area table 44 for the radio zone, in which the mobile station has registered, thus obtaining the radio zone identification SL7.SL24.Z46. In addition, they retrieve the broadcast data table 52 stored in the broadcast station memory 745 to check whether it is necessary to provide the broadcast data containing the retrieved radio zone identification SL7.SL24.Z46 as the destination to other mobile switching centers, and they transmit the broadcast data for the call to the mobile switching center 7 with the mobile switching center identification MSC7 via the control signal transceiver 745. For the radio base stations governed by the mobile switching center 8, they describe the radio zone identification SL7.SL24.Z46 as the destination of the broadcast data and simultaneously broadcast the data to their governed radio base stations. The selective relays 32 and 33 receiving the broadcast data relay the data to their lower layer broadcast layers 110 and 111 because the destination of the data is stored in the relaying identification memories 68 and 69. The broadcast data relayed to the broadcast layer 110 is received by the radio base stations 237 and 238 linked thereto. Because the identification SL7.SL24.Z46 contained in the broadcast data is among the radio zone identifications notified by the radio base stations 237 and 238, these base stations issue a call to the mobile station with the mobile station identification MS5 to the respective radio zones 337 and 338. Likewise, the broadcast data relayed to the broadcast layer 111 is received by radio base stations 239 and 240, which thus issue a call to their radio zones 339 and 340. Meanwhile, the broadcast data transmitted from the mobile switching center 8 to the mobile switching center 7 contains as the designation the identification MSC7 of the mobile switching center, the radio zone identification SL7.SL24.Z46 and the mobile station identification MS5. The location registration information relay 743 in the mobile switching center 7 changes the destination of the broadcast data from the identification MSC7 of the mobile switching center 7 to the radio zone identification SL7.SL24.Z46 in the broadcast data. The selective relay 30 discards the received broadcast data because the destination of the received broadcast data is the identification SL7.SL24.Z46 which is not stored in the relaying identification memory 66. On the other hand, the selective relay 31 relays the received broadcast data to the broadcast layer 109 because the destination SL7.SL24.Z46 of the received broadcast data is stored in the relaying identification memory 67. The broadcast data relayed to the broadcast layer 109 is received in the radio base stations 235 and 236. The radio base station 236 issues a call to its served radio zone 336 because the radio zone identification SL7.SL24.Z46 contained in the broadcast data is among the radio zone identifications notified by it. The radio base station 235, however, does not issue any call to its served radio zone 335 because the radio zone identification SL7.SL24.Z46 is not among the radio zone identifications notified by it.

In the present invention, using the control signaling network according to the first aspect of the invention, the radio base station according to the second aspect of the invention and the mobile switching center according to the third aspect of the invention, the broadcast layer identification is set as the destination of the data broadcast from the mobile switching center, thus preventing the sending of unnecessary broadcast data to the radio base stations and alleviating the data reception load thereon.

Also, using the control signaling network according to the fourth aspect of the invention and the radio base station according to the fifth aspect of the invention, the radio zone identification is set as the destination of data broadcast from the mobile switching center, thus preventing the sending of unnecessary broadcast data to the radio base stations and alleviating the data reception load thereon.

Further, using the signal control network according to the third aspect of the invention, broadcast layers directly linked to radio base stations governed by different mobile switching centers are linked together, thus permitting each mobile switching center to transmit broadcast data to radio base stations governed by different mobile switching centers and permitting a call to be placed with respect to different mobile switching centers.

Furthermore, using the mobile switching center according to the seventh aspect of the invention, each mobile switching center, when informed of a radio zone identification of a radio base station not governed by itself from a radio base station governed by it, notifies the informed data to the mobile switching center governing that radio base station, and the notified mobile switching center stores in the broadcast data table the identification of the mobile switching center, to which the broadcast data is to be transmitted, thus permitting simultaneous call to mobile stations belonging to two or more mobile switching centers while preventing unnecessary broadcast data communication.

Further, using the mobile switching center according to the eighth aspect of the invention, each mobile switching center, upon notification of the radio zone served by a radio base station not governed by it from its governed radio base station, notifies this to the mobile switching center governing that radio base station, and the notified mobile switching center stores in the broadcast data table the identification of the mobile switching center, to which the broadcast data is to be transmitted, thus permitting simultaneous call to mobile stations belonging to two or more mobile switching centers while preventing unnecessary broadcast data communication.

What is claimed is:

1. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signaling network linking said mobile switching center and said radio base stations, said control signaling network comprising:

a plurality of broadcast layers including a lower broadcast layer, said broadcast layers being arranged in a hierarchical arrangement and identified by broadcast layer identifications corresponding to respective layers of the hierarchical arrangement; and selection relays for selectively relaying calling signals containing a hierarchically low-order broadcast layer identification or a registered area identification, as a destination address of said calling signals and in response to direct linking to the broadcast layer indicated as the destination address of said calling signals, changing the broadcast layer identification to the registered area identification contained in the calling signals as a new destination address of the calling signal, the selection relays operating solely unidirectionally by relaying calling signals solely from a higher hierarchical layer toward a lower hierarchical layer, said selection relays and radio base stations in the same hierarchical layer receiving said call signals simultaneously and said selection relays comparing call signals with an identification code of the lower broadcast layer, thereby transmitting a calling signal data from said mobile switching center to the radio base stations governed by the mobile switching center.

2. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signalling network linking said mobile switching center and said radio base stations, said radio base stations comprising:

a location registration information memory for storing location registration information which consists of a plurality of registered area identifications and is for use for registration of locations of the mobile stations; and a broadcast layer identification notifier for transmitting to the mobile switching center governing said radio base stations, upon changing of a registered area identification in said location registration information corresponding to a radio base station linked to another broadcast layer, a changed registered area identification together with the identification of the broadcast layer which is linked to said radio base station.

3. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signaling network linking said mobile switching center and said radio base stations, said mobile switching center comprising:

an intrastation broadcast memory, storing a correspondence table between identifications of registered areas, in which a mobile station has made a location registration request, and identifications of broadcast layers;

a calling signal generator for generating calling signals whose destination address is a broadcast layer identification drawn from a column of registered area identifications in said correspondence table stored in said intrastation broadcast memory;

a control signal transceiver for transmitting and receiving control signals to and from radio base stations; and an intrastation destination address changer for receiving from a radio base station a signal containing the identification of the broadcast layer linking said radio base station, and location registration information which consists of a plurality of registered area identifications, and then storing the broadcast layer identification contained in the received signal in a column of the registered area identifications contained in the received signal in said intrastation broadcast memory, and on the other hand, receiving from a radio base station a signal containing the identification of the broadcast layer linking said radio base station and the identification of the registered area removed from the location registration information, and then deleting the broadcast layer identification contained in the received signal from a column of the registered area identification contained in the received signal in said intrastation broadcast memory;

said mobile switching center thereby transmitting, upon a terminating call thereto, calling signals containing the broadcast layer identification stored in the column of the identification of the registered area, in which the called mobile station has made a location registration request, as the destination address of the calling signal and said calling signal also containing the identification of a registered area.

4. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signaling network linking said mobile switching center and said radio base stations, said control signaling network comprising:

a plurality of broadcast layers including a lower broadcast layer, said broadcast layers being arranged in a hierarchical arrangement and identified by broadcast layer identifications corresponding to respective layers of the hierarchical arrangement;

a relaying identification memory for storing a destination address of a calling signal; and selective relays for selectively relaying only calling signals having a destination address stored in said relaying identification memory, the selective relays operating solely unidirectionally by relaying calling signals solely from a higher hierarchical layer toward a lower hierarchical layer;

said selection relays receiving said call signals simultaneously and said selection relays comparing call signals with an identification code of the lower broadcast layer, the calling signal transmitted from said mobile switching center being thereby transmitted to the radio base station governed by the mobile switching center.

5. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signaling network linking said mobile switching center and said radio base stations, said radio base stations comprising:

a location registration information memory for storing location registration information which consists of a plurality of registered area identifications, for use for registration of locations of mobile stations; and a broadcast identification notifier for transmitting to the mobile switching center governing said radio base station, upon changing of a registered area identification in said location registration information, corresponding to a radio base station linked to another broadcast layer, the changed registered area identification.

6. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signaling network linking said mobile switching center and said radio base stations, said control signaling network comprising:

a plurality of broadcast layers arranged in a hierarchical arrangement and identified by broadcast layer identifications corresponding to respective layers of the hierarchical arrangement; and a non-selective and non-conditional relay link connecting directly to each other a pair of adjacent broadcast layers in the hierarchical arrangement and linking radio base stations governed by a pair of different respective mobile switching centers to each other, said non-selective and non-conditional relay link operating solely unidirectionally by relaying call signals solely from a higher hierarchical layer toward a lower hierarchical layer;

a calling signal transmitted from said mobile switching center being thereby transmitted not only to the broadcast layers governed by said mobile switching center but also to geographically adjacent broadcast layers governed by another mobile switching center.

7. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signaling network linking said mobile switching center and said radio base stations, said mobile switching center comprising:

an extrastation broadcast layer memory storing a correspondence table between identifications of registered areas, in which a mobile station has made a location registration request, and identifications of broadcast layers governed by another mobile switching center;

a control signal transceiver for transmitting and receiving control signals to and from said governed radio base stations and the other mobile switching center;

a broadcast layer identification relay for relaying a signal to the mobile switching center governing the radio base station contained in said signal, upon receiving said signal from one of said governed radio base stations, said signal containing the identification of the broadcast layer linking said radio base station and an identification of a registered area corresponding to a radio base station governed by the other mobile switching center; and a broadcast layer identification changer for changing, upon receiving said relayed signal from the other mobile switching center, the identification of the broadcast layer governed by the mobile switching center stored in the column of the registered area identification contained in said relayed signal in said extrastation broadcast memory;

said mobile switching center thereby transmitting, upon a terminating call thereto, a calling signal to the radio base stations governed by said mobile switching center, and also transmitting, in response to the identification of a broadcast layer governed by the other mobile switching center being stored in said extrastation broadcast memory, said calling signal to said broadcast layer via the other mobile switching center.

8. In a mobile communication system comprising a plurality of mobile stations, a plurality of radio zones, a plurality of radio base stations in said radio zones for communication with mobile stations in the radio zones by using radio channels, a mobile switching center governing said radio base stations, and a control signaling network linking said mobile switching center and said radio base stations, said mobile switching center comprising:

a broadcast station memory storing a correspondence table between the identifications of registered areas, in which a mobile station has made a location registration request, and identifications of other mobile switching centers;

a control signal transceiver for transmitting and receiving control signals to and from said governed radio base stations and the other mobile switching centers;

a broadcast layer identification relay for relaying, upon receiving from one of said governed radio base stations a signal containing an identification of a registered area corresponding to a radio base station governed by a different mobile switching center, said signal to the mobile switching center governing the radio base station contained in said signal, and changing, upon receiving of a signal containing the mobile switching center's identification as the destination address and also the registered area identification, said signal into a signal containing said registered area identification as the destination address; and a broadcast station identification changer for changing, upon receiving said relayed signal from the other mobile switching centers, the identification of the mobile switching center stored in the column of the registered area identification contained in said relayed signal in said broadcast station memory;

said mobile switching center thereby transmitting, upon a terminating call thereto, a calling signal to the radio base stations governed by said mobile switching center, and also transmitting, said calling signal to the other mobile switching center in response to the identification of the different mobile switching center being stored in said broadcast center memory.

* * * * *